(12) United States Patent
Zhu

(10) Patent No.: US 11,106,200 B2
(45) Date of Patent: Aug. 31, 2021

(54) SAFETY MECHANISM FOR JOYSTICK CONTROL FOR CONTROLLING AN UNMANNED VEHICLE

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 98 days.

(21) Appl. No.: 16/455,355

(22) Filed: Jun. 27, 2019

(65) Prior Publication Data

US 2020/0409351 A1 Dec. 31, 2020

(51) Int. Cl.
*G05D 1/00* (2006.01)
*B64C 39/02* (2006.01)

(52) U.S. Cl.
CPC .......... *G05D 1/0016* (2013.01); *G05D 1/0088* (2013.01); *G05D 2201/0213* (2013.01)

(58) Field of Classification Search
CPC ...... G05D 1/00; G05D 1/0016; G05D 1/0088; G05D 2201/0213; G01C 21/00; G01C 21/16; G01C 21/165; B60T 7/00; B60T 7/12; B60T 7/22; B60T 8/00; B60T 8/72; B60T 8/76; B60T 8/86; B64C 39/024
See application file for complete search history.

(56) References Cited

U.S. PATENT DOCUMENTS

| | | | | |
|---|---|---|---|---|
| 8,214,088 | B2 * | 7/2012 | Lefebure | G08C 17/02 |
| | | | | 701/2 |
| 9,410,783 | B1 * | 8/2016 | Khuc | F42C 15/42 |
| 9,524,648 | B1 * | 12/2016 | Gopalakrishnan | H04K 3/224 |
| 2011/0288696 | A1 * | 11/2011 | Lefebure | A63H 30/04 |
| | | | | 701/2 |
| 2012/0123628 | A1 * | 5/2012 | Duggan | B64C 19/00 |
| | | | | 701/24 |
| 2014/0324253 | A1 * | 10/2014 | Duggan | G05D 1/0088 |
| | | | | 701/3 |
| 2015/0002391 | A1 * | 1/2015 | Chen | H04N 5/23293 |
| | | | | 345/156 |
| 2016/0132052 | A1 * | 5/2016 | Seydoux | G05D 1/0022 |
| | | | | 701/2 |
| 2017/0083103 | A1 * | 3/2017 | Chen | G06F 3/017 |
| 2018/0275653 | A1 * | 9/2018 | Endo | G05D 1/0055 |
| 2019/0064793 | A1 * | 2/2019 | Sun | B60R 16/0236 |
| 2019/0163189 | A1 * | 5/2019 | Jensen | G05D 1/0212 |
| 2019/0176862 | A1 * | 6/2019 | Kumar | G06K 9/00651 |
| 2020/0073385 | A1 * | 3/2020 | Jobanputra | G06F 9/547 |

* cited by examiner

*Primary Examiner* — Yonel Beaulieu
(74) *Attorney, Agent, or Firm* — Womble Bond Dickinson (US) LLP

(57) ABSTRACT

A method, apparatus, and system that improves operation safety of a remote vehicle controller is disclosed. The operations comprise: receiving, at an autonomous vehicle, controller outputs from a controller; determining that a first switch is activated at the controller based on the controller outputs, wherein the first switch being activated indicates a first vehicle control command; determining whether all of one or more second switches are activated at the controller based on the controller outputs; in response to determining that all of the one or more second switches are activated, executing the first vehicle control command; and in response to determining that not all of the one or more second switches are activated, ignoring the first vehicle control command.

20 Claims, 7 Drawing Sheets

SAFETY MECHANISM FOR JOYSTICK CONTROL FOR CONTROLLING AN UNMANNED VEHICLE

TECHNICAL FIELD

Embodiments of the present disclosure relate generally to operating autonomous vehicles. More particularly, embodiments of the disclosure relate to remotely controlling non-passenger and/or fully automated vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

In certain scenarios, a controller may be utilized by a human user to remotely control the operation and travel of non-passenger (i.e., unmanned) vehicles, whether autonomous, semi-autonomous, or non-autonomous, that are equipped with full electronic control capabilities. In still other scenarios, it may be necessary for a human user to intervene in the operation and travel of a fully automated (i.e., Level 5) autonomous vehicle remotely through the use of a controller. Safety measures that reduce human and/or hardware signal errors are important with the use of the controllers, especially when the controllers used are not industrial-grade products.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
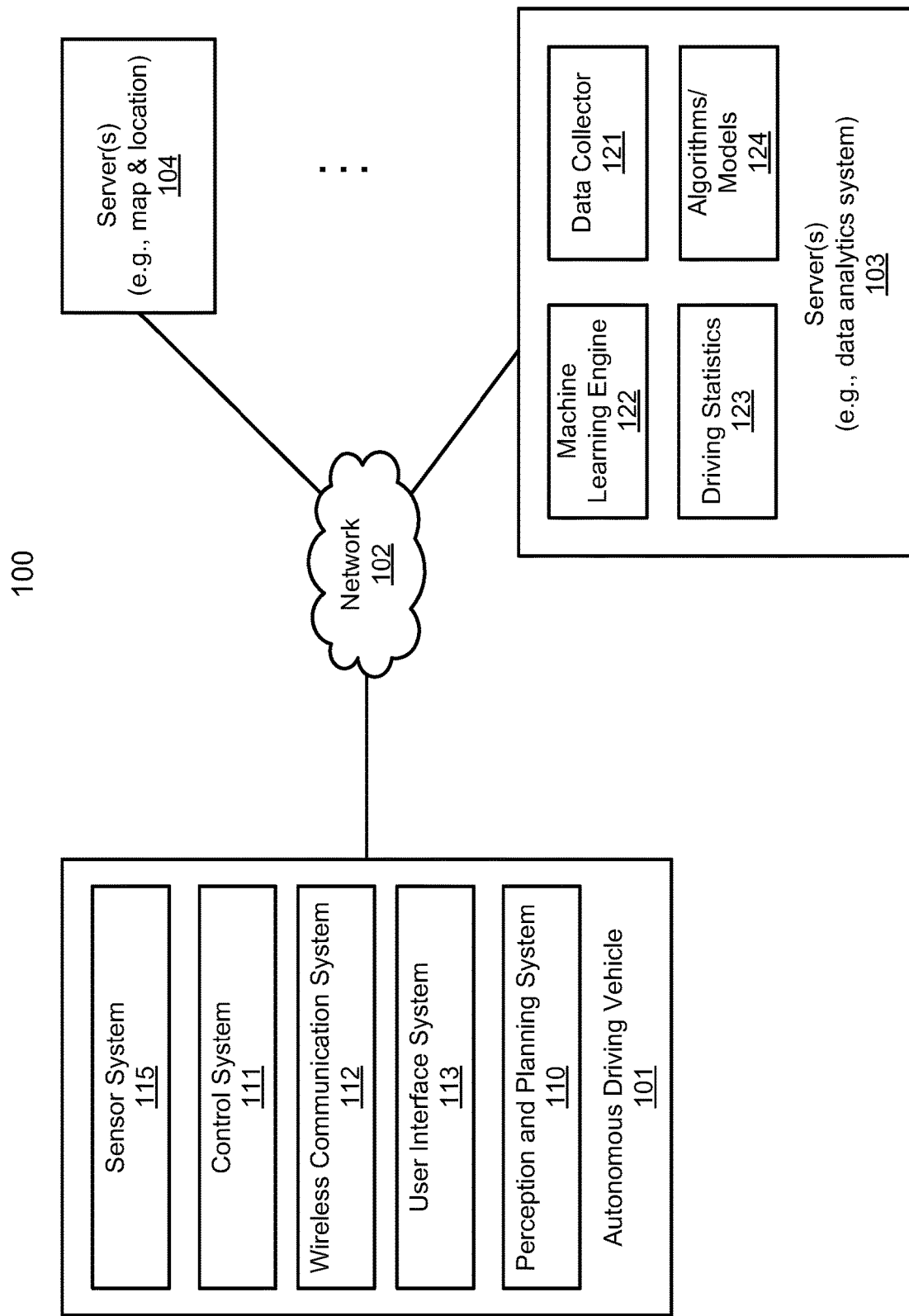
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosure are related to a method, apparatus, and system that improves operation safety of a remote vehicle controller. The operations include: receiving, at an autonomous vehicle, controller outputs from a controller; determining that a first switch is activated at the controller based on the controller outputs, wherein the first switch being activated indicates a first vehicle control command; determining whether all of one or more second switches are activated at the controller based on the controller outputs; in response to determining that all of the one or more second switches are activated, executing the first vehicle control command; and in response to determining that not all of the one or more second switches are activated, ignoring the first vehicle control command.

In one embodiment, the controller is a gaming controller, wherein the first switch is a push button, and wherein the one or more second switches are triggers. In one embodiment, the one or more second switches include two triggers. In one embodiment, the first vehicle control command is an acceleration command. In one embodiment, the operations further include: in response to determining that not all of the one or more second switches are activated, executing an automatic brake command. In one embodiment, executing the automatic brake command includes applying a deceleration that gradually increases with time up to a maximum deceleration to a motion of the autonomous vehicle.

In one embodiment, the operations further include: subsequent to determining that not all of the one or more second switches are activated, determining that all of the one or more second switches are activated; and in response to determining that all of the one or more second switches are activated subsequent to determining that not all of the one or more second switches are activated, cancelling the automatic brake command. In one embodiment, when the first vehicle control command is not a brake command, cancelling the automatic brake command comprises: determining a second deceleration, the second deceleration gradually decreasing with time until the second deceleration reaches zero; and applying the second deceleration to the motion of the autonomous vehicle.

In one embodiment, when the first vehicle control command is a brake command associated with a first deceleration, cancelling the automatic brake command comprises: determining a second deceleration, the second deceleration gradually decreasing with time until the second deceleration reaches zero; and applying a greater deceleration between the first deceleration and the second deceleration to the motion of the autonomous vehicle.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
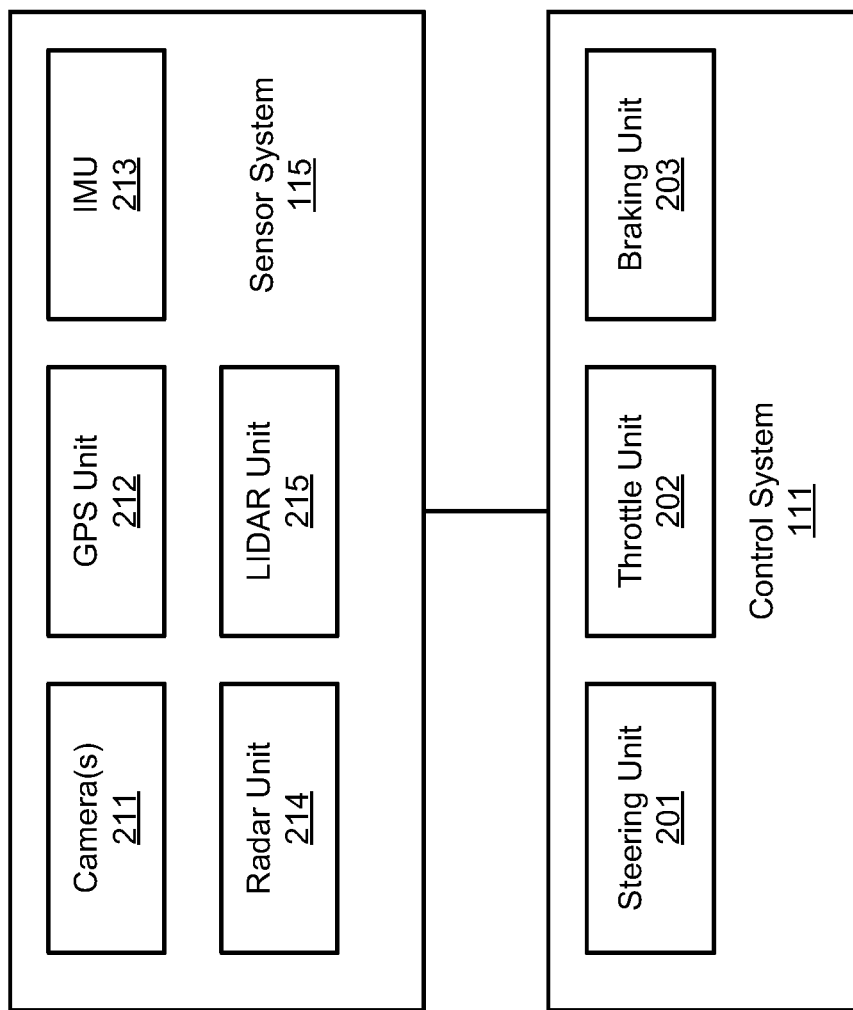
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on autonomous vehicles to be utilized during autonomous driving in real-time.

Figure 3A:
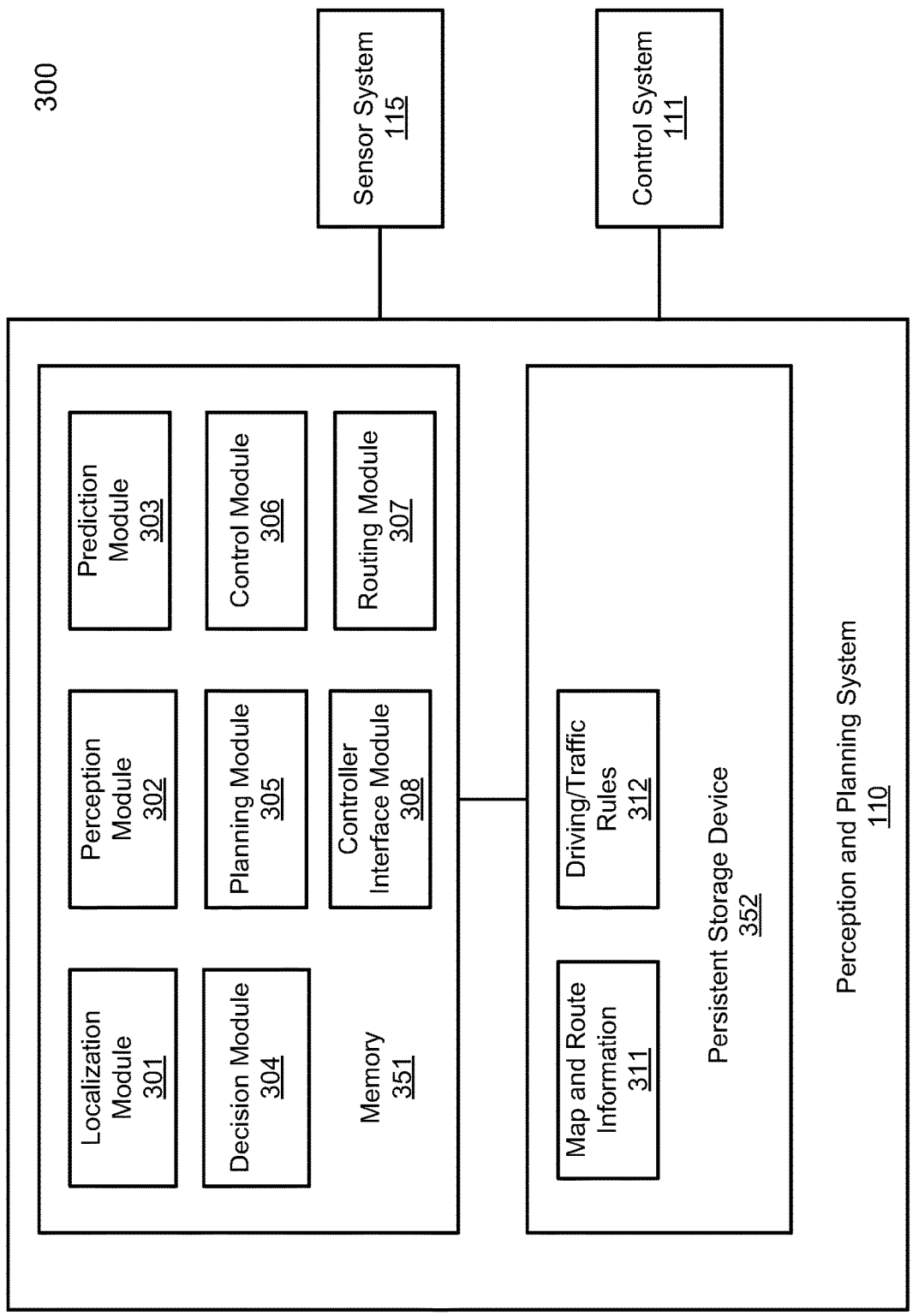
FIGS. 3A-3B are block diagrams illustrating an example of a perception and planning system used with an autonomous vehicle according to one embodiment.
Figure 3B:
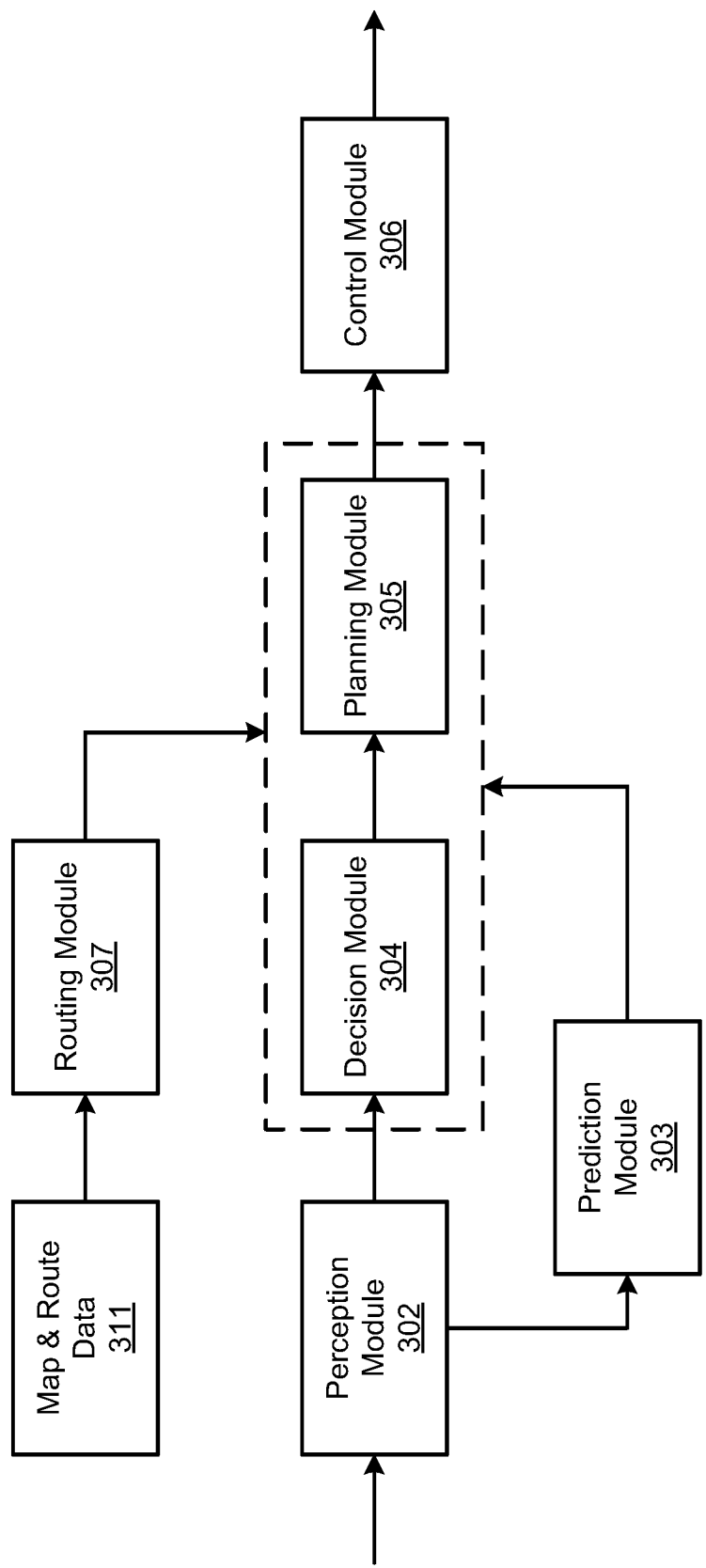

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, controller interface module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an autonomous vehicle should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the autonomous vehicle may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the autonomous vehicle to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Controller interface module 308 is configured to communicate with a controller 500 (See FIG. 5 below), and receive control commands from the controller 500. When a user uses the controller 500 to issue commands to the vehicle 101, the commands are forwarded to control module 306. Control module 306 may generate control signals to operate the vehicle 101 in accordance with the commands received from the controller 500.

Figure 4:
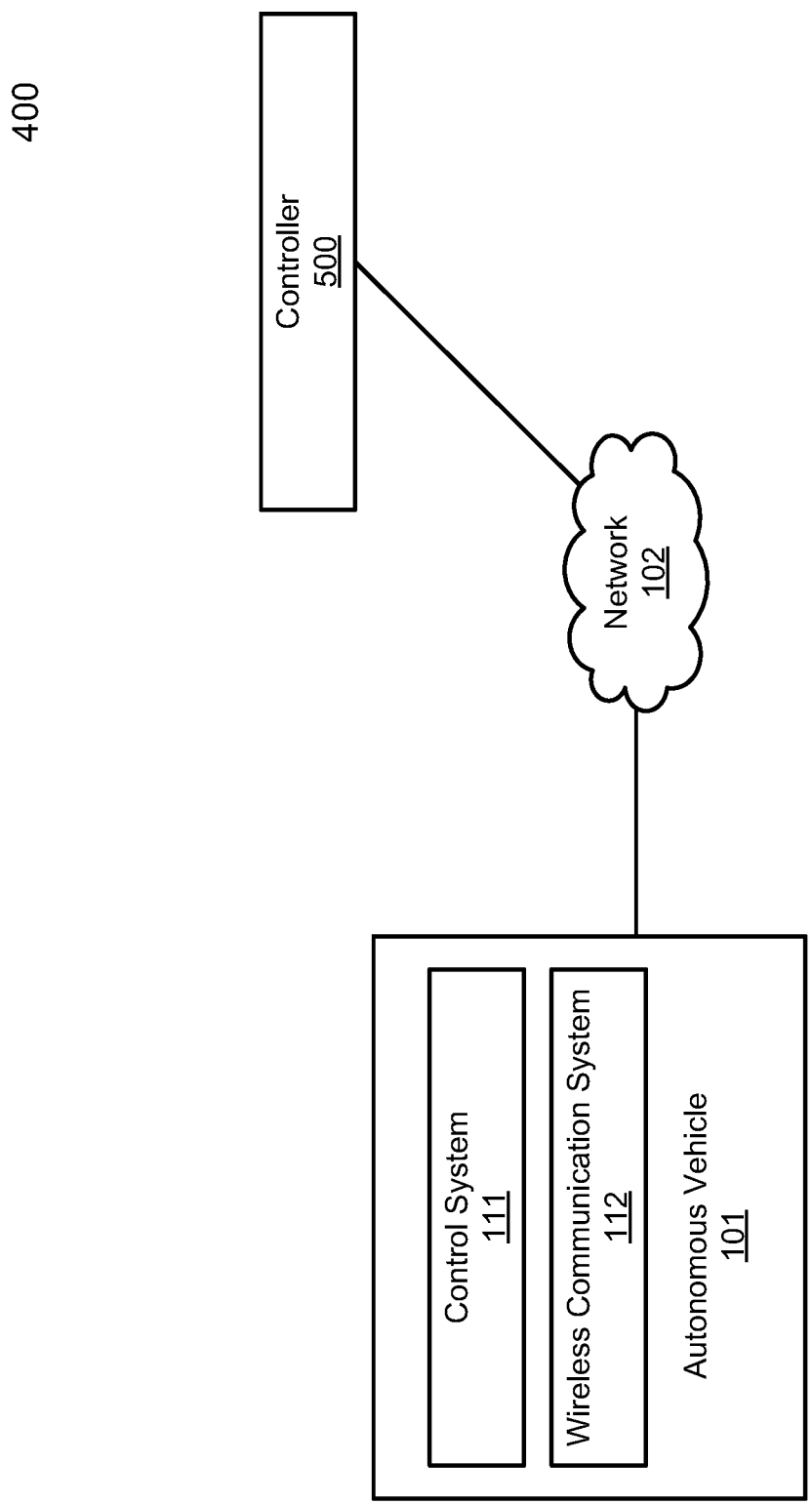
FIG. 4 is a block diagram illustrating an example environment in which embodiments of the disclosure are practiced.

Referring to FIG. 4, a block diagram illustrating an example environment 400 in which embodiments of the disclosure are practiced is shown. The autonomous vehicle 101 may communicate with a controller 500 over a network 102. Autonomous vehicle 101 may communicate over the network 102 wirelessly through the wireless communication system 112. Thus, a user may issue commands to the vehicle 101 remotely using the controller 500. Upon receiving the commands, the control system 111 may generate control signals to operate the autonomous vehicle 101 in accordance with the received control signals.

Figure 5:
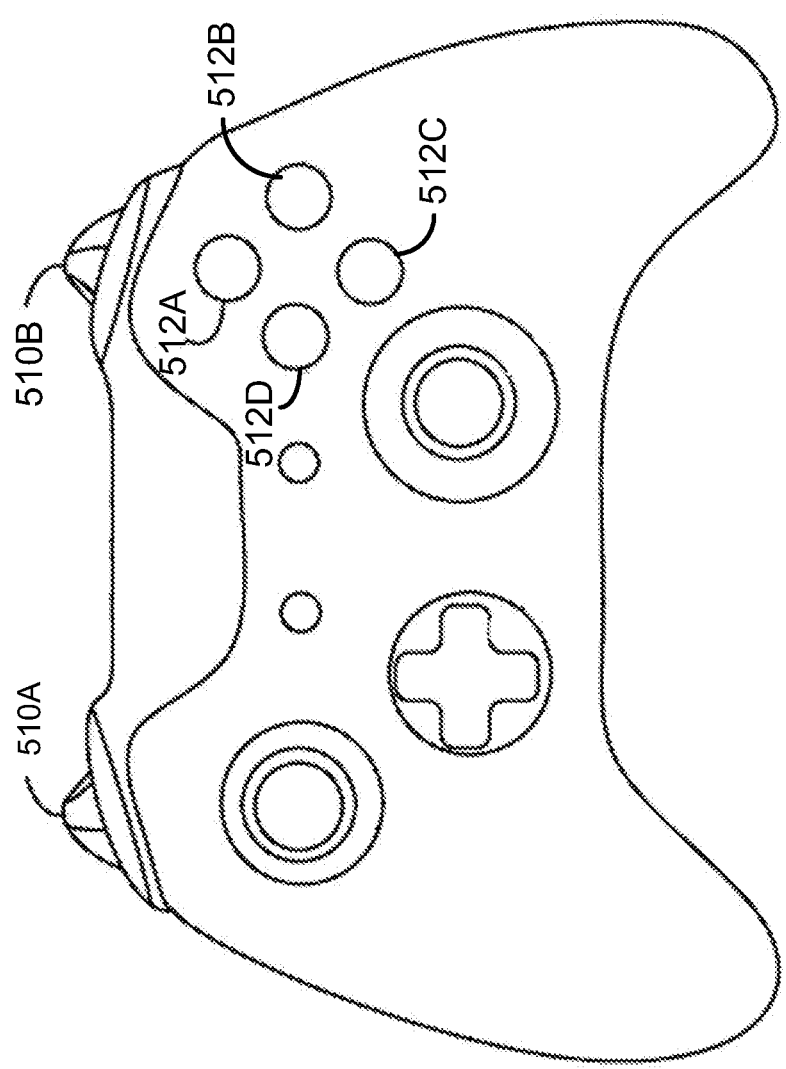
FIG. 5 is a diagram illustrating an example controller according to one embodiment.

Referring to FIG. 5, a diagram illustrating an example controller 500 according to one embodiment is shown. The controller 500 may be a video gaming controller. In one embodiment, the triggers 510A, 510B may serve as enable switches, and may be referred to as second switches. Each of the push buttons 512A-D may correspond to one vehicle control command (e.g., accelerate, brake, honk, etc.), and may be referred to as a first switch. Switches such as the direction pad and analog sticks may be used to control the direction of travel of the vehicle under remote control.

Under normal operation, whenever a switch of the controller 500 is activated (e.g., depressed, triggered, etc.), a corresponding signal is transmitted to the vehicle. Thus, when one of the first switches 512A-D is activated, a corresponding signal output is transmitted to the autonomous vehicle, and the autonomous vehicle would decode the controller output and determine a corresponding first vehicle control command (e.g., one of accelerate, brake, honk, etc.). However, the first vehicle control command is not executed at the vehicle unless all of the enable switches are activated at the same time. In other words, in one embodiment, whether all (both) of one or more second switches 510A, 510B are activated at the controller at a same time as the activation of the first switch 512A-D can also be determined based on the controller outputs. In response to determining that all of the one or more second switches are activated at a same time as the activation of the first switch 512A-D, the first vehicle control command may be executed. On the other hand, in response to determining that not all (both) of the one or more second switches are activated at a same time as the activation of the first switch 512A-D, the first vehicle control command is ignored at the vehicle.

In one embodiment, the first vehicle control command is an acceleration command.

In one embodiment, in response to determining that not all of the one or more second switches are activated, an automatic brake command is executed. Executing the automatic brake command comprises applying a deceleration that gradually increases with time (e.g., 1 m/s² more with each passing second) up to a maximum deceleration (e.g., −3 m/s²) to a motion of the autonomous vehicle.

In one embodiment, subsequent to determining that not all of the one or more second switches are activated, determining that all of the one or more second switches are activated; and in response to determining that all of the one or more second switches are activated subsequent to determining that not all of the one or more second switches are activated, the previously executed automatic brake command is cancelled.

In one embodiment, when the first vehicle control command is not a brake command, cancelling the automatic brake command comprises: determining a second deceleration, the second deceleration gradually decreasing with time (e.g., 2 m/s² less with each passing second) until the second deceleration reaches zero; and applying the second deceleration to the motion of the autonomous vehicle.

In one embodiment, when the first vehicle control command is a brake command associated with a first deceleration, cancelling the automatic brake command comprises: determining a second deceleration, the second deceleration gradually decreasing with time (e.g., 2 m/s² less with each passing second) until the second deceleration reaches zero; and applying a greater deceleration between the first deceleration and the second deceleration to the motion of the autonomous vehicle until the vehicle comes to a stop or the brake command is canceled (e.g., after the user releases the first switch corresponding to the brake command).

Figure 6:
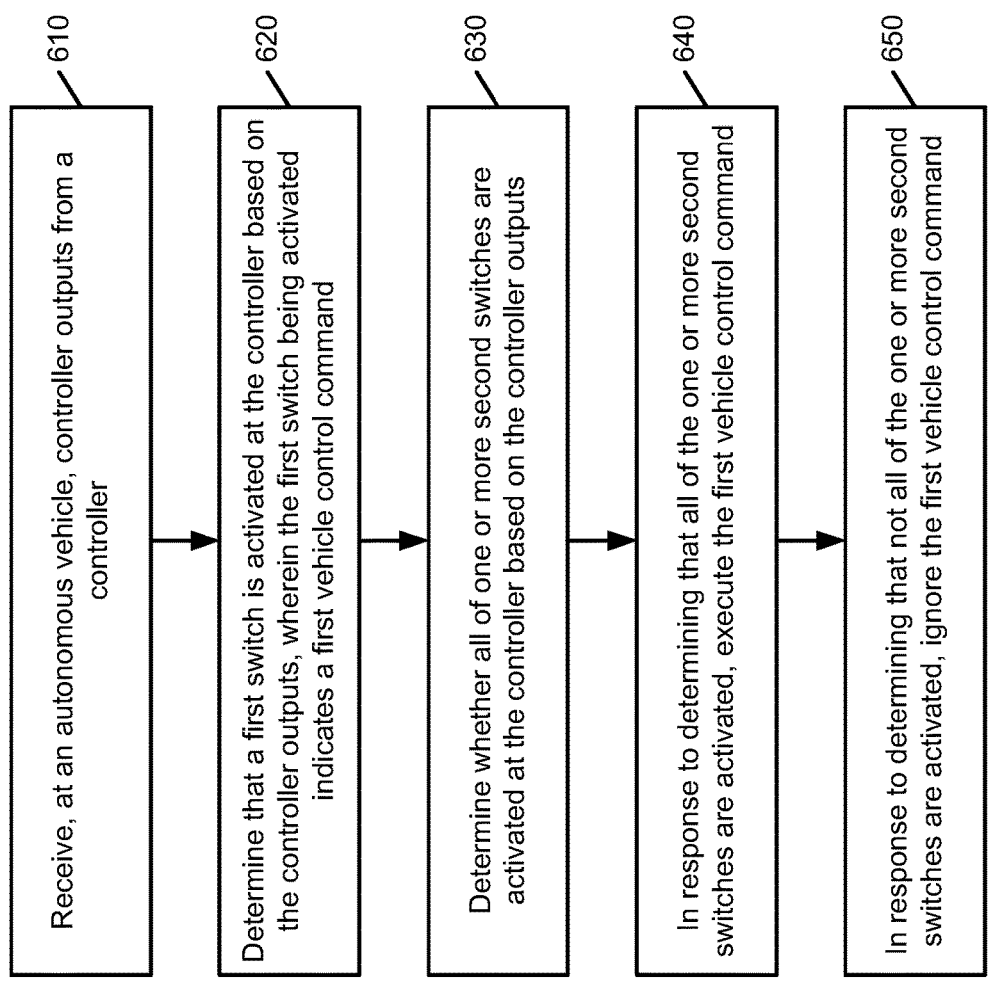
FIG. 6 is a flowchart illustrating an example method for improving operation safety of a remote vehicle controller according to one embodiment.

Referring to FIG. 6, a flowchart illustrating an example method 600 for improving operation safety of a remote vehicle controller according to one embodiment is shown. At block 610, controller outputs from a controller are received at an autonomous vehicle. At block 620, that a first switch is activated at the controller is determined based on the controller outputs, wherein the first switch being activated indicates a first vehicle control command. At block 630, whether all of one or more second switches are activated at the controller is determined based on the controller outputs. At block 640, in response to determining that all of the one or more second switches are activated, the first vehicle control command is executed. At block 650, in response to determining that not all of the one or more second switches are activated, the first vehicle control command is ignored.

Therefore, embodiments of the disclosure relate to one or more enable switches of a controller that is used to remotely control an unmanned or fully automated vehicle. The vehicle control command as indicated by the controller output is ignored at the vehicle unless all of the one or more enable switches of the controller are activated at a same time as the activation of a switch of the controller that corresponds to a substantive vehicle control command. Human errors can be reduced as careless activation of all of the enable switches is an unlikely event. Further, the negative consequences of hardware signal errors may be ameliorated. For example, with the automatic brake command, the probability of a brake command failing to execute is reduced. This is especially useful when the controller is a non-industrial grade controller.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
    receiving, at an autonomous vehicle, a controller output from a controller communicatively coupled to the autonomous vehicle;
    determining that a first switch is activated at the controller based on the controller output, wherein the first switch being activated indicates a first vehicle control command;
    determining whether all of one or more second switches are activated at the controller based on the controller output;
    in response to determining that the first switch is activated and all of the one or more second switches are activated, executing the first vehicle control command to control the autonomous vehicle; and in response to determining that the first switch is activated and at least one of the one or more second switches is not activated, ignoring the first vehicle control command.

2. The method of claim 1, wherein the controller is a gaming controller, wherein the first switch is a push button, and wherein the one or more second switches are trigger buttons.

3. The method of claim 1, wherein the one or more second switches comprise two trigger buttons.

4. The method of claim 1, wherein the first vehicle control command is an acceleration command.

5. The method of claim 1, further comprising:
in response to determining that not all of the one or more second switches are activated, executing an automatic brake command.

6. The method of claim 5, wherein executing the automatic brake command comprises applying a deceleration that gradually increases with time up to a maximum deceleration to a motion of the autonomous vehicle.

7. The method of claim 6, further comprising:
subsequent to determining that not all of the one or more second switches are activated, determining that all of the one or more second switches are activated;
and in response to determining that all of the one or more second switches are activated subsequent to determining that not all of the one or more second switches are activated, cancelling the automatic brake command.

8. The method of claim 7, wherein when the first vehicle control command is not a brake command, cancelling the automatic brake command comprises:
determining a second deceleration, the second deceleration gradually decreasing with time until the second deceleration reaches zero; and
applying the second deceleration to the motion of the autonomous vehicle.

9. The method of claim 7, wherein when the first vehicle control command is a brake command associated with a first deceleration, cancelling the automatic brake command comprises:
determining a second deceleration, the second deceleration gradually decreasing with time until the second deceleration reaches zero; and
applying a greater deceleration between the first deceleration and the second deceleration to the motion of the autonomous vehicle.

10. A non-transitory machine-readable medium having instructions stored therein, which when executed by a processor, cause the processor to perform operations, the operations comprising:
receiving, at an autonomous vehicle, a controller output from a controller communicatively coupled to the autonomous vehicle;
determining that a first switch is activated at the controller based on the controller output, wherein the first switch being activated indicates a first vehicle control command;
determining whether all of one or more second switches are activated at the controller based on the controller output;
in response to determining that the first switch is activated and all of the one or more second switches are activated, executing the first vehicle control command to control the autonomous vehicle; and
in response to determining that the first switch is activated and at least one of the one or more second switches is not activated, ignoring the first vehicle control command.

11. The non-transitory machine-readable medium of claim 10, wherein the controller is a gaming controller, wherein the first switch is a push button, and wherein the one or more second switches are trigger buttons.

12. The non-transitory machine-readable medium of claim 10, wherein the one or more second switches comprise two trigger buttons.

13. The non-transitory machine-readable medium of claim 10, wherein the first vehicle control command is an acceleration command.

14. The non-transitory machine-readable medium of claim 10, wherein the operations further comprising:
in response to determining that not all of the one or more second switches are activated, executing an automatic brake command.

15. The non-transitory machine-readable medium of claim 14, wherein executing the automatic brake command comprises applying a deceleration that gradually increases with time up to a maximum deceleration to a motion of the autonomous vehicle.

16. The non-transitory machine-readable medium of claim 15, wherein the operations further comprise:
subsequent to determining that not all of the one or more second switches are activated, determining that all of the one or more second switches are activated;
and in response to determining that all of the one or more second switches are activated subsequent to determining that not all of the one or more second switches are activated, cancelling the automatic brake command.

17. The non-transitory machine-readable medium of claim 16, wherein when the first vehicle control command is not a brake command, cancelling the automatic brake command comprises:
determining a second deceleration, the second deceleration gradually decreasing with time until the second deceleration reaches zero; and
applying the second deceleration to the motion of the autonomous vehicle.

18. The non-transitory machine-readable medium of claim 16, wherein when the first vehicle control command is a brake command associated with a first deceleration, cancelling the automatic brake command comprises:
determining a second deceleration, the second deceleration gradually decreasing with time until the second deceleration reaches zero; and
applying a greater deceleration between the first deceleration and the second deceleration to the motion of the autonomous vehicle.

19. A data processing system, comprising:
a processor; and
a memory coupled to the processor to store instructions, which when executed by the processor, cause the processor to perform operations, the operations including
receiving, at an autonomous vehicle, a controller output from a controller communicatively coupled to the autonomous vehicle;
determining that a first switch is activated at the controller based on the controller output, wherein the first switch being activated indicates a first vehicle control command;

determining whether all of one or more second switches are activated at the controller based on the controller output;

in response to determining that the first switch is activated and all of the one or more second switches are activated, executing the first vehicle control command to control the autonomous vehicle; and in response to determining that the first switch is activated and at least one of the one or more second switches is not activated, ignoring the first vehicle control command.

20. The data processing system of claim 19, wherein the controller is a gaming controller, wherein the first switch is a push button, and wherein the one or more second switches are trigger buttons.

* * * * *